United States Patent [19]

Inagaki et al.

[11] Patent Number: 5,577,016
[45] Date of Patent: Nov. 19, 1996

[54] RECORDING MEDIUM HAVING CONCAVO-CONVEX PITS WITH A MAXIMUM AND A MINIMUM PIT DEPTH DEPENDING ON THE WAVELENGTH OF A LASER LIGHT

[75] Inventors: Tatsuhiko Inagaki, Takatsuki; Hiroshi Kohso, Fujiidera; Makoto Kuwamoto, Hirakata, all of Japan

[73] Assignee: Matsushita Electric Industrial Co., Ltd., Kadoma, Japan

[21] Appl. No.: 503,481

[22] Filed: Jul. 18, 1995

Related U.S. Application Data

[62] Division of Ser. No. 139,573, Oct. 20, 1993, Pat. No. 5,463,609.

[30] Foreign Application Priority Data

Oct. 23, 1992 [JP] Japan ..................... 4-285756

[51] Int. Cl.⁶ .............................. G11B 7/24; G11B 5/68
[52] U.S. Cl. .................. 369/110; 369/112; 369/275.4; 369/107; 369/109; 369/44.12
[58] Field of Search ................. 369/275.4, 112, 369/109, 116, 275.2, 44.12, 44.26, 13, 107; 250/201.5; 360/114

[56] References Cited

U.S. PATENT DOCUMENTS

| | | | |
|---|---|---|---|
| 4,949,331 | 8/1990 | Maeda et al. | 369/275.3 |
| 4,978,187 | 12/1990 | Minemura et al. | 369/53 |
| 4,985,881 | 1/1991 | Saito et al. | 369/13 |
| 5,031,162 | 7/1991 | Morimoto et al. | 369/275.4 |
| 5,049,462 | 9/1991 | Funhoff et al. | 430/21 |
| 5,084,860 | 1/1992 | Maeda et al. | 369/275.3 |
| 5,125,750 | 6/1992 | Corle et al. | 359/819 |
| 5,144,552 | 9/1992 | Abe | 369/275.4 |
| 5,249,175 | 9/1993 | Akahira et al. | 369/275.1 |
| 5,453,969 | 9/1995 | Psaltis et al. | 369/275.4 |
| 5,463,609 | 10/1995 | Inagaki et al. | 369/112 |

FOREIGN PATENT DOCUMENTS

| | | |
|---|---|---|
| 0356201 | 2/1990 | European Pat. Off. . |
| 0369671 | 5/1990 | European Pat. Off. . |
| 0385337 | 9/1990 | European Pat. Off. . |
| 0423662 | 4/1991 | European Pat. Off. . |
| 0438054 | 7/1991 | European Pat. Off. . |
| 0469879 | 2/1992 | European Pat. Off. . |
| 2578083 | 8/1986 | France . |
| 3620301 | 1/1987 | Germany . |
| 56-140536 | 11/1981 | Japan . |

(List continued on next page.)

OTHER PUBLICATIONS

Search Report for European Appl. 93117152.4, mailed Aug. 17, 1995.
Journal of Applied Physics vol. 66, No. 10, Nov. 15, 1989, Werner Hickel et al., "Surface Plasmon Microscopic Characterization Of External Surfaces", pp. 4832–4836.

*Primary Examiner*—Georgia Y. Epps
*Assistant Examiner*—Kim-Kwok Chu
*Attorney, Agent, or Firm*—Renner, Otto, Boisselle & Sklar

[57] ABSTRACT

The information recording and reproducing apparatus includes: a recording medium including a plurality of concavo-convex pits; a light source for emitting laser light; a section for changing an optical characteristic value of the laser light, using interaction between the laser light and the recording medium; and a light detector for detecting the optical characteristic value of the laser light after the interaction occurs, and then outputting a signal in response to the detected optical characteristic value. The section for changing the optical characteristic value includes an evanescent wave generating section for generating an evanescent wave from the laser light. The evanescent wave generating section changes the optical characteristic value in accordance with how much the concavo-convex pits of the recording medium influences the evanescent wave. Multivalued data is reproduced on the basis of the signal from the light detector. The multivalued data corresponds to the dimension of the concavo-convex pits measured along the direction normal to the recording medium.

6 Claims, 13 Drawing Sheets

FOREIGN PATENT DOCUMENTS

| | | |
|---|---|---|
| 58-102347 | 6/1983 | Japan . |
| 59-36347 | 2/1984 | Japan . |
| 60-20331 | 2/1985 | Japan . |
| 60-121550 | 6/1985 | Japan ............... G11B 7/24 |
| 63-257921 | 10/1988 | Japan . |
| 1-112552 | 5/1989 | Japan . |
| 1-144252 | 6/1989 | Japan . |
| 1-179225 | 7/1989 | Japan . |
| 2-179951 | 7/1990 | Japan . |
| 2-244445 | 9/1990 | Japan . |
| 2-308423 | 12/1990 | Japan . |
| 3-141032 | 6/1991 | Japan . |
| 3-201230 | 9/1991 | Japan . |
| 4-14620 | 1/1992 | Japan . |
| 4-26978 | 1/1992 | Japan . |
| 4-62090 | 2/1992 | Japan . |
| 5-34129 | 2/1993 | Japan . |
| 2111200 | 6/1983 | United Kingdom . |

RECORDING MEDIUM HAVING CONCAVO-CONVEX PITS WITH A MAXIMUM AND A MINIMUM PIT DEPTH DEPENDING ON THE WAVELENGTH OF A LASER LIGHT

This is a division of application Ser. No. 08/139,573, filed Oct. 20, 1993, now U.S. Pat. No. 5,463,609, issued on Oct. 31, 1995.

BACKGROUND OF THE INVENTION

1. Field of the Invention

The present invention relates to an apparatus for optically recording and reproducing information and a method using the same.

2. Description of the Related Art

Recently, apparatus for optically recording and reproducing information have been remarkably developed in the fields of the information and communication industry as well as the audiovisual industry. Especially, an optical disc in which information, as a concavo-convex pit array, is stored in a circular substrate and light is condensed onto a micro-spot so as to reproduce the information, has been standardized and spread all over the world under the name of a compact disc (hereinafter, referred to as a "CD"). Such a system utilizes the diffraction phenomenon of light for reproducing information. That is, the presence or absence of a pit can be determined by detecting the intensity of light which is reflected from the surface of the CD, since there is a difference between the reflectivity of a pit-present portion and that of a pit-absent portion, which is caused by the diffraction of the light. According to the current CD standard, the difference in reflectivity is expected to be about 30%. A reproduced signal is represented by binary digits showing the presence or absence of the pit. The length of the pits and/or the spacings between the respective pits is determined based on the contents of the information to be stored. That is, the information is recorded as a size change of surface features of a recording medium in an in-plane direction, so that the improvement of the storage density of the CD is largely restricted by the diffraction limit of a reproduced light. Another method is proposed, in which the difference in reflectivity of 20% or less is obtained by utilizing the fact that the reflectivity changes as the phase of medium changes.

Japanese Laid-Open Patent Publication No. 4-14620 proposes an information recording and reproducing system utilizing surface plasmon resonance in order to remarkably improve reproduction sensitivity much more than the above systems presently do. According to this system, a recording medium is obtained by laminating arachidic acid cadmium salt on a silver layer, and the presence or absence of the arachidic acid cadmium salt is detected with a difference in reflectivity of 90% or more. Thus, according to this system utilizing the surface plasmon resonance, remarkably higher difference in reflectivity (90% or more) can be obtained compared with the system utilizing the diffraction phenomenon of the light ( about 30%), and the system utilizing the change of the phase of the medium (20% or less). However, this system also has the same problem of the storage density as the system utilizing the diffraction phenomena has, since it also employs the same recording method in which the information is represented by the binary digits showing the presence or absence of the arachidic acid cadminate layer, and then the information to be recorded is modulated and represented by the length of the pit and the spacing between the respective pits. That is, even if employing the system utilizing the surface plasmon resonance, the pit density is restricted by the spot diameter during the reproduction performance, and the spot diameter is determined by an optical wavelength and a numeral aperture (NA) of the condenser lens. Therefore, in order to improve the storage density, a power source having a short wavelength or a lens having a large NA is required. Therefore, this system utilizing the surface plasmon resonance can improve the reproduction sensitivity but cannot improve the storage density compared with the system utilizing the diffraction phenomena of the light.

SUMMARY OF THE INVENTION

In accordance with one aspect of the invention, an information recording and reproducing apparatus includes:

a recording medium including a plurality of concavo-convex pits, a light source for emitting laser light, a means for changing the optical characteristic value of the laser light, using interaction between the laser light and the recording medium, and a light detector for detecting the optical characteristic value of the laser light after the interaction occurs, and then outputting a signal in response to the detected optical characteristic value;

wherein the means for changing the optical characteristic value includes an evanescent wave generating means for generating an evanescent wave from the laser light, and the evanescent wave generating means changes the optical characteristic value in accordance with how much the concavo-convex pits of the recording medium influences the evanescent wave; and multivalued data is reproduced on the basis of the signal from the light detector, the multivalued data corresponding to the dimension of the concavo-convex pits measured along the direction normal to the recording medium.

In accordance with another aspect of the invention, an information recording and reproducing method, includes:

a first step for recording data into a recording medium as a plurality of concavo-convex pits, a second step for changing an optical characteristic value of the laser light, using interaction between the laser light and the recording medium, and a third step for detecting the optical characteristic value of the laser light after the interaction occurs, and then outputting a signal in response to the detected optical characteristic value;

wherein, at the second step, an evanescent wave is generated from the laser light, and the optical characteristic value of the laser light is changed in accordance with how much the concavo-convex pits of the recording medium influences the evanescent wave.

Herein, the optical characteristic value of the laser light represents the intensity or the phase and polarization condition of the laser light, or the combination of the intensity, and the phase and polarization condition of the laser light.

Herein, the concavo-convex pit means pits in which concave portions or convex portions are formed on the surface of the recording medium, or pits in which the concave portions and the convex portions are mixedly formed on the surface of the recording medium.

Thus, the invention described herein makes possible the advantage of providing an information recording and reproducing apparatus with which the storage density can remarkably be improved, and a method using the same.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrating examples with reference to drawings.

EXAMPLE 1

Figure 1:
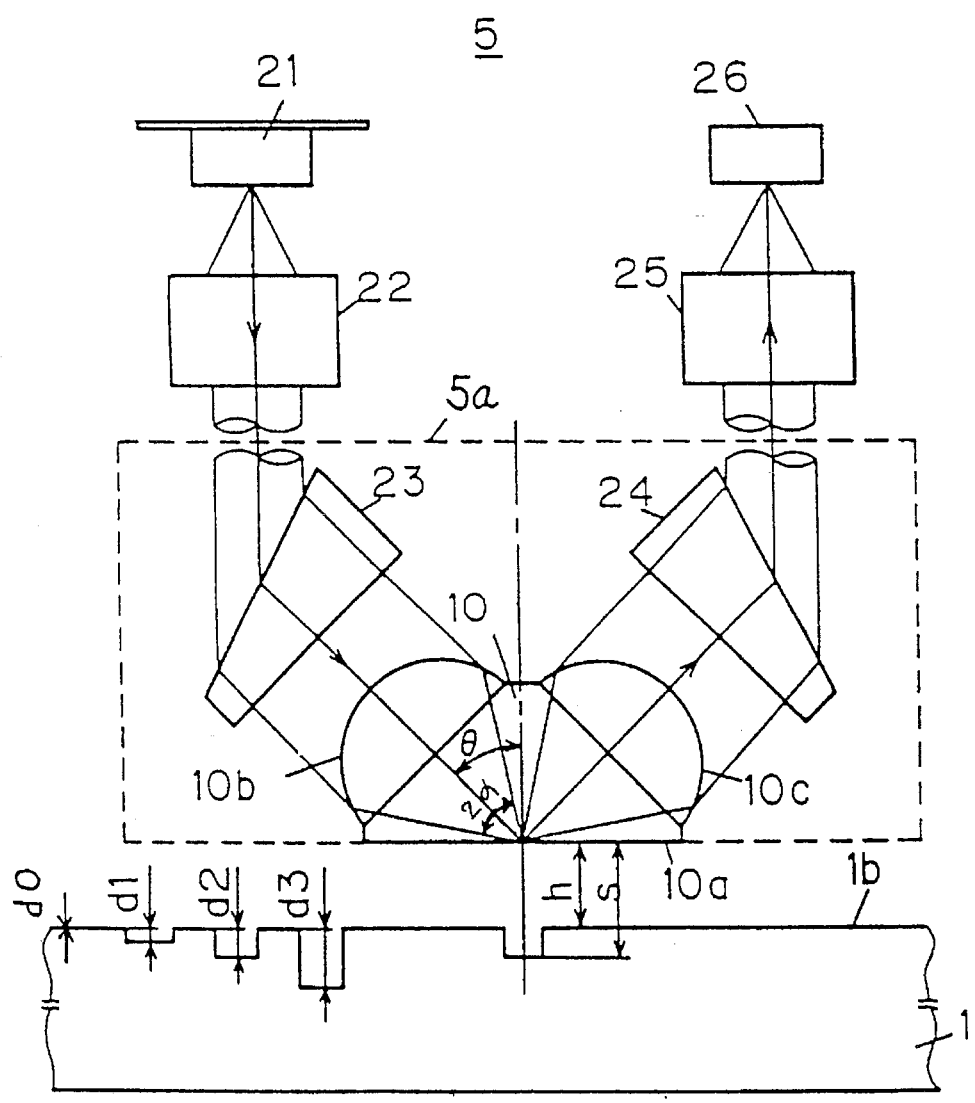
FIG. 1 is a structural view showing a reproducing apparatus according to a first example of the present invention.

FIG. 1 shows a structural view of an information reproducing apparatus according to the first example of the present invention. In FIG. 1, a discoidal recording medium 1 is made of polycarbonate resin (refractive index: 1.59). A plurality of concentric circular recording tracks are provided on the surface of the recording medium 1. As is schematically shown in FIG. 1, each recording track is provided with four pits d0, d1, d2, and d3 each having different depths 0 µm, 0.05 µm, 0.11 µm, and 0.27 µm, respectively. The surface layer of the recording medium 1, where the pits are formed, is referred to as a recording layer 1b. The recording layer 1b is rotated by a spindle motor (not shown). An optical head 5 is arranged so as to face the recording layer 1b. The optical head 5 includes an evanescent wave generator 10, a semiconductor laser 21, a collimator 22, an incident light deflection prism 23, a reflected light deflection prism 24, a receiver lens 25, and a photodiode 26. The light (wavelength: 780 nm) from the semiconductor laser 21 is collimated by the collimator 22, polarized by the incident light deflection prism 23, and then enters the evanescent wave generator 10. The evanescent wave generator 10 has a nonspherical surface structure on respective two facets sandwiching the right angle of a rectangular prism therebetween. The evanescent wave generator 10 is integrated with an optical glass SF11 (refractive index: 1.79). Herein, the surface of the evanescent wave generator 10 facing the recording layer 1b is called a reflection surface 10a; the nonspherical surface structure on the left side is called a condenser lens 10b; and the nonspherical surface structure on the right side is called a light-receiving lens 10c. The light beam is condensed by the condenser lens 10b at an angular aperture of $2\alpha=70$ degrees. The beam waist is in conformity with the reflection surface 10a and becomes a plane-wave having an incident angle of 45 degrees on the reflection surface 10a. The polarized light becomes p-polarized light. The reflected light from the reflection surface 10a is led to the photodiode 26 through the light-receiving lens 10c (angular aperture: 70 degrees), the reflected light deflection prism 24, and the receiver lens 25. The evanescent wave generator 10, the incident light deflection prism 23, and the reflected light deflection prism 24, which are mounted on a head slider (not shown), are generically called a movable part 5a. The head slider is sufficiently large compared with the width of the recording track. The movable part 5a is moved following the recording medium 1 so that the perpendicular distance from the reflection surface 10a to the tracking-absent portion (i.e., original medium surface) is always maintained at 0.07 µm by a fluid lubrication effect. Herein, the perpendicular distance is represented by a flying height h. The propagation direction of the light which enters into and is emitted from the movable part 5a is exactly normal to the surface of the recording medium 1. Therefore, even if the surface of the recording medium 1 is run-out, the light path within the movable part 5a does not change.

Hereinafter, the operation of the information recording and reproducing apparatus according to the first example of the present invention will be described. The present example is carried out in order to prove that the information recording and reproducing method of the present invention is suitable for supplying the same information to a number of users, i.e., for a delivery media.

First, the recording process according to the present example will be described. Data to be recorded is modulated to time series data using four values of 0, 1, 2, and 3. The data 0, 1, 2, and 3 are made corresponding to pit depths d0, d1, d2, and d3, respectively, and thus an original plate is produced by using a laser cutting technique. Thereafter, a stamper is made from the original plate, and the recording medium 1 is duplicated by using a plastic formation technique. According to the above steps, the original information is recorded and stored on the recording medium 1 as a pit array which is modulated so as to have four values in the depth direction. That is, according to the present example, the displacement of the surface level of the recording layer 1b in the out-of-plane direction is also used as information, so that the information volume to be recorded per pit can be increased by at least twice as much as that of the conventional recording method using binary digit data.

Figure 2:
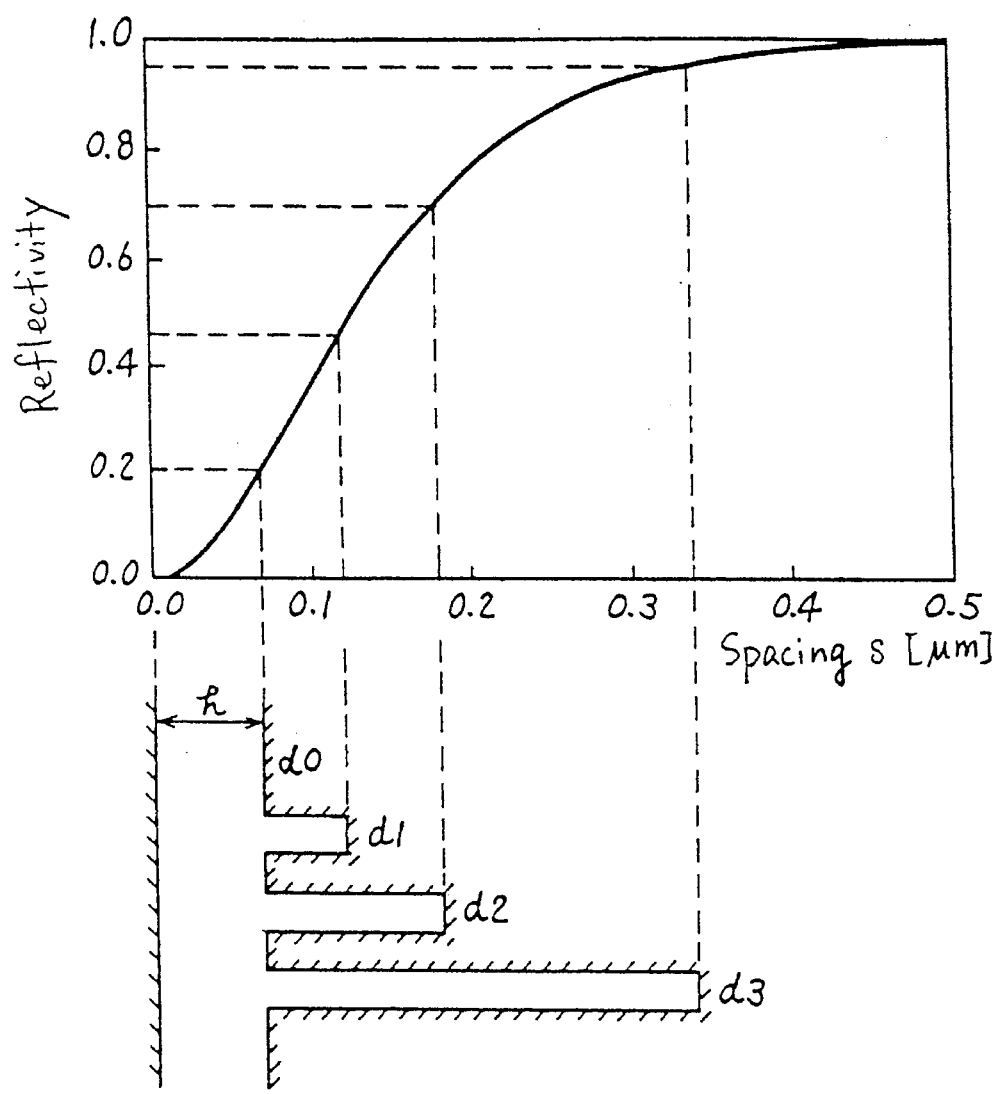
FIG. 2 is a view showing the relationship between a reflectivity and a spacing according to the first example.

Next, the reproducing process will be described with reference to FIGS. 1 and 2. According to the present example, each pit depth is detected utilizing the fact that the reflectivity of the reflection surface 10a is attenuated due to the attenuated total reflection as described later, and the thus detected pit depth is demodulated to the original information. Generally, when the light enters an interface between a first medium with a larger refractive index and a second medium with a smaller refractive index at an angle of a critical angle or more, the total reflection occurs, i.e., the reflectivity of the interface becomes 1. However, the energy of the light penetrates into the second medium with the smaller refractive index. Such energy of the light becomes a nonradiative mode called an evanescent wave. The evanescent wave is exponentially attenuated as going away from the interface. The effective penetration distance of the evanescent wave, which depends on the refractive index difference across the interface and the incident angle is generally a wavelength or less. When a third medium is arranged so as to be closest to the interface, the energy to be introduced into the third medium is increased in accordance with the distance therebetween, and the reflectivity of the interface is attenuated. This phenomena is called attenuated total reflection (or frustrated total reflection), which can be explained as a tunneling phenomenon of a photon in terms of the quantum theory. According to the present example, the incident angle to the reflection surface 10a is 45 degrees, larger than the critical angle of 34 degrees, and the recording layer 1b is close to the reflection surface 10a at a distance of a wavelength or less. Therefore, the above-mentioned attenuated total reflection occurs, and the reflectivity of the reflection surface 10a is changed in accordance with the distance (hereinafter, referred to as a spacing s) between the reflection surface 10a and the surface of the recording layer 1b immediately below the spot. FIG. 2 shows the relationship between the reflectivity and the spacing s according to the first example. When the spacing s is 0 μm (i.e., when the reflection surface 10a is in contact with the recording medium 1 immediately below the spot), the reflectivity is almost 0. When the spacing s is 0.5 μm or more, the reflectivity is almost 1, which indicates that the total reflection occurs. As the spacing s is increased from 0.0 to 0.5, the reflectivity is monotonously increased. Therefore, by detecting the reflectivity, the spacing s can be determined. Herein, the spacing s is the sum total of the flying height h and the pit depth immediately below the spot. The four pits d0, d1, d2, and d3 have reflectivity 20%, 45%, 70%, and 95%, respectively. Thus, the four pits can be discriminated from one another with a reflectivity difference of 25%. In accordance with the rotation of the recording medium 1, time series signals, which have been amplitude-modulated to four values by the photodiode 26, are demodulated to reproduce the original information.

According to the present example, the information is recorded using the displacement of the surface level of the recording medium in the out-of-plane direction, and then the recorded information is reproduced at high sensitivity using the attenuated total reflection phenomenon. Therefore, it is possible to increase the information volume to be recorded per pit by at least twice as much as that of the prior art. Moreover, each recording track can be provided with eight types of pits having different depths so that the pits can be discriminated from one another with reflectivity difference of 10%. In this case, the information to be recorded per pit can be tripled at least. That is, the displacement of the surface level of the recording medium in the out-of-plane direction can also be used as information by utilizing the fact that the interaction caused between the evanescent wave and recording medium is very sensitive to the spacing s. Therefore, the storage density can remarkably be improved compared with the conventional system utilizing only the displacement of the surface level of the recording medium in the in-plane direction.

Next, the reason why the pit density can be improved compared with the prior art will be described. The pit density of the present example is restricted by the spot diameter of the reproducing apparatus in the same way as the prior art. However, the present example makes it possible to realize a spot diameter of a wavelength or less, thereby improving the pit density. Generally, the spot diameter 2w is given by the following equation:

$$2w = k \cdot \lambda / NA \qquad (1)$$

wherein $\lambda$ denotes a wavelength of a light source, NA denotes the numerical aperture of the condenser lens, and k denotes a constant determined by the shape of the lens and the intensity distribution of the incident light, herein k is 0.8. As is apparent from the above Equation (1), as NA is larger, the resulting spot can be made smaller. The numerical aperture NA is represented by the following equation:

$$NA = n \cdot \sin \alpha \qquad (2)$$

wherein $\lambda$ denotes a half of the angular aperture of the condenser lens, and n denotes a refractive index of the medium between the condenser lens and the reflection surface. Conventionally, the medium between the condenser lens and the reflection surface is air, so that n is 1. Accordingly, NA is determined by the angular aperture alone. For example, the angular aperture $2\alpha$ of a lens used for a CD is 53 degrees, so that NA thereof is 0.45. Furthermore, in order to achieve a higher storage density, a lens having an angular aperture of about 70 degrees and NA of about 0.57 has been put into practical use for a magneto-optic disc apparatus. In this case, the spot diameter 2w is calculated at 1.4λ by the above Equation (1). Thus, according to the conventional information recording and reproducing apparatus, the angular aperture $2\alpha$ should be made large in order to reduce the spot diameter. However, sins is always 1 or less, so that NA will never exceed 1 in theory.

On the other hand, according to the present example, the medium having a refractive index n of 1.79 is filled between the reflection surface 10a and the condenser lens 10b, so that the numerical aperture NA as large as 1.03 can be obtained from the above Equation (2) even when the angular aperture is 70 degrees. Therefore, the spot diameter 2w is calculated at 0.78λ by the above Equation (1). Thus, the fine spot diameter of the wavelength of the light source or less is realized. The pit density is in inverse proportion to the square of the spot diameter, so that the pit density is increased up to 3.2 times as much as that of the conventional apparatus having the same angular aperture.

Thus, according to the present example, the medium having the larger refractive index than that of the air is filled between the reflection surface 10a and the condenser lens 10b, so that the condenser lens 10b can have NA larger than that of the conventional condenser lens, thereby remarkably increasing the pit density. That is, the numerical aperture NA of the condenser lens can be made large by using a material having a larger refractive index, irrespective of the angular aperture $2\alpha$. For example, when using zirconia (n=2.2), the NA of the condenser lens is 1.26, and a spot diameter 2w of $0.63\lambda$ can be obtained. When using gallium phosphide (n=3.4), the NA of the condenser lens is 1.95 and the spot diameter 2w of $0.41\lambda$ can be obtained. In the present example, the incident light is condensed onto a single nonspherical surface, but it may be condensed onto a plurality of curved surfaces as long as the medium having a refractive index larger than that of the air is filled between the last curved surface and the reflection surface. According to the present example, the refractive surface and the reflection surface are simultaneously formed to be integrated into one, so that the focus point and the position of the reflection surface can exactly agree with each other. Thus, reliance is improved so much that alignment for the optical path, the optical axis, and the like can be omitted, thereby remarkably reducing the number of the production steps. The method for producing the apparatus of the present invention is not limited to the above method. For example, even if the apparatus of the present invention is produced by using a method in which members are separately fabricated and then combined with one another by bonding or the like, the same effects can be obtained.

The optical head employed in the present invention can be applied to any other information recording apparatus in which information is recorded by changing the geometry or the optical characteristics of the recording medium, and to any other information reproducing apparatus in which the thus recorded information is reproduced by condensing the light onto the reflection surface, and then generating evanescent waves.

Therefore, according to the present example, the information volume to be recorded per pit as well as the pit density can be increased, thereby remarkably improving the storage density much more compared with the prior art.

EXAMPLE 2

Hereinafter, a second example of the present invention will be described with reference to FIGS. 3 and 4.

Figure 3:
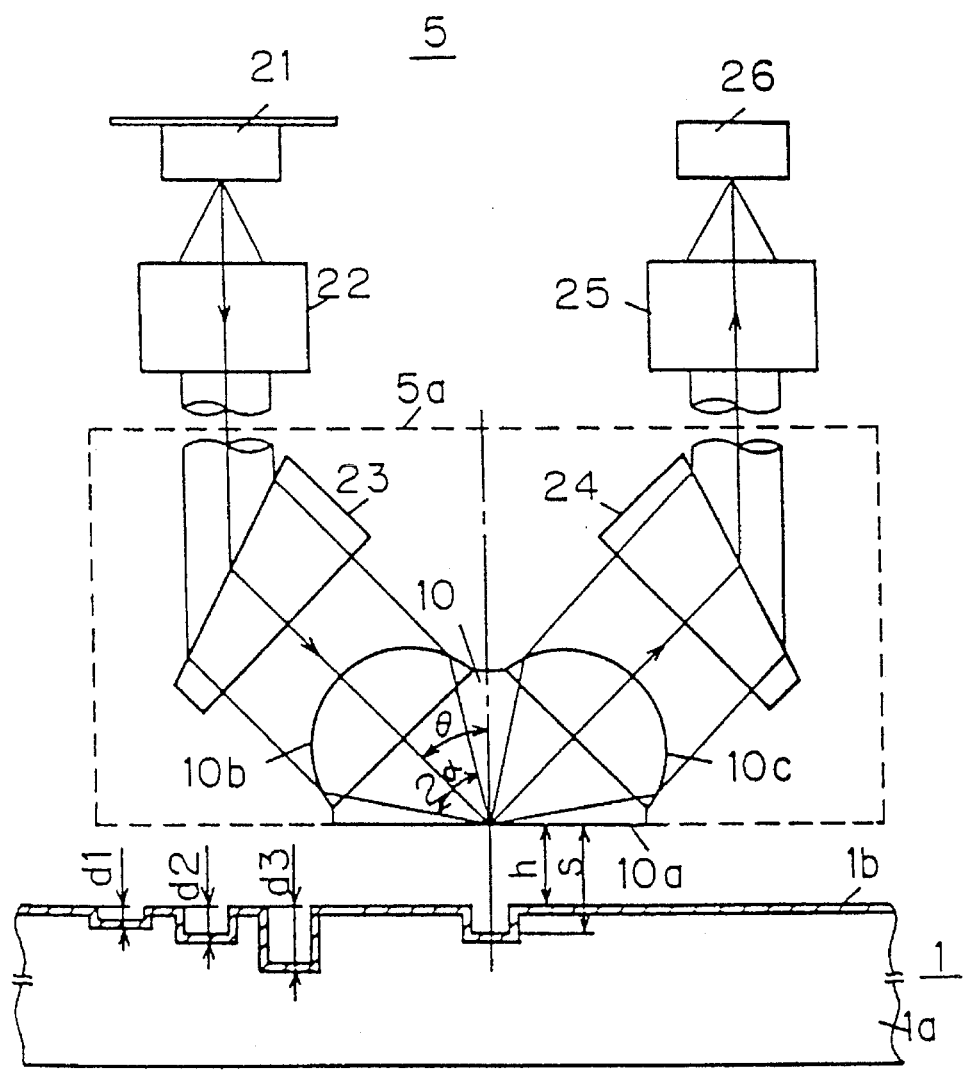
FIG. 3 is a structural view showing a reproducing apparatus according to a second example of the present invention.
Figure 4:
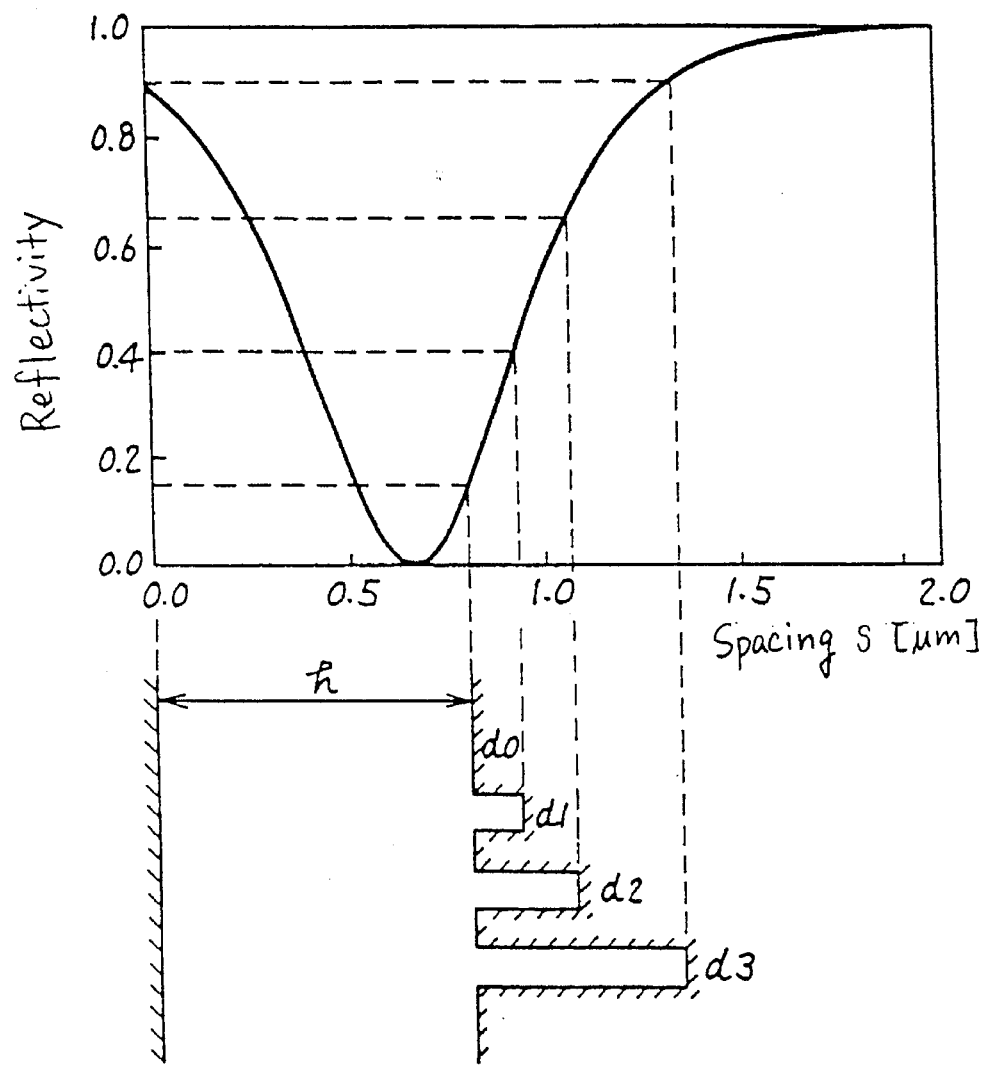
FIG. 4 is a view showing the relationship between a reflectivity and a spacing according to the second example.

FIG. 3 shows a structural view of an information reproducing apparatus according to the second example of the present invention. In FIG. 3, a discoidal recording medium 1 is formed by laminating a recording layer 1b made of gold on a substrate 1a made of polycarbonate resin. A plurality of concentric circular recording tracks are provided on the surface of the recording medium 1. As is schematically shown in FIG. 3, each recording track is provided with four pits d0, d1, d2, and d3 having different depths 0 µm, 0.13 µm, 0.26 µm, and 0.53 µm, respectively. An optical head 5 is arranged so as to face the recording layer 1b. The optical head 5 includes an evanescent wave generator 10 made of an optical glass BK7. A light flux is incident on a reflection surface 10a at an incident angle of 44 degrees. The perpendicular distance from the reflection surface 10a to a tracking-absent portion of the recording layer 1b always remains 0.81 µm (the distance is represented by the flying height h in the same way as Example 1). The information reproducing apparatus of the second example has the same configuration as that of Example 1 except the structure of the recording medium 1, the material for the evanescent wave generator 10, the incident angle at which the incident light enters the reflection surface 10a, and the flying height h. Therefore, the description thereof will be omitted.

Hereinafter, the operation of the information recording and reproducing apparatus according to the second example of the present invention will be described.

First, the recording process according to the second example will be described. In the same process as described in the first example, a pit array which is modulated so as to have four values is formed on the substrate 1a. Thereafter, gold is sputtered on the surface of a substrate 1a, thereby forming the recording layer 1b. According to the above steps, the information is recorded as a displacement of the surface level of the recording layer 1b in an out-of-plate direction. In a manner similar to that of the first example, the information volume to be recorded per pit is increased by at least twice as much as that of the conventional recording method using binary digit data.

Next, the reproducing process will be described with reference to FIGS. 3 and 4. FIG. 4 shows the relationship between the reflectivity of the reflection surface 10a and the spacing s between the reflection surface 10a and the surface of the recording layer 1b immediately below the spot. When the spacing s is 0.67 µm, the reflectivity becomes 0. This is caused due to the surface plasmon resonance phenomenon. The surface plasmon is one kind of elementary excitations present on the surface of a material which can be excited by an optical means. That is, when the dispersion relationship of the evanescent wave generated out of the reflection surface 10a meets the dispersion relationship of plasma wave generated on the surface of the recording layer 1b, the surface plasmon is excited, and consequently the energy of the incident light is resonantly absorbed. Herein, the dispersion relationship means the relationship between the wave number and the angular frequency. The angular frequency is kept to be constant, so that the incident angle is selected so as to obtain a desired wave number of the evanescent wave. Thus, these dispersion relationships are made to meet each other. Both the wave number and the spacing s are essential factors for causing the surface plasmon resonance on arbitrary metal surface. Herein, the incident angle is 44 degrees and the spacing s is 0.67 µm, which satisfies the conditions for causing surface plasmon resonance on gold of the recording layer 1b. In other words, when the incident angle or the spacing s is deviated from the above values, the reflectivity is changed to sensitively respond thereto. As is shown in FIG. 4, the surface plasmon resonance has a dependency on the spacing s. In the present example, by utilizing this dependency, the reflectivity is determined in order to detect the spacing s. Herein, the spacing s is the sum total of the flying height h and the pit depth immediately below the spot. The four pits d0, d1, d2, and d3 have reflectivity of 15%, 40%, 65%, and 90%, respectively, as is seen from FIG. 4. Thus, the four pits can be discriminated from one another with reflectivity difference of 25%. In accordance with the rotation of the recording medium 1, time series signals, which have been amplitude-modulated to four values by the photodiode 26, are demodulated to reproduce the original information.

Thus, according to the present invention, it is possible to increase the information volume to be recorded per pit by at least twice as much as that of the prior art. Moreover, each recording track can be provided with eight types of pits having different depths so that the pits can be discriminated from one another with reflectivity difference of 12.5%. In this case, the information to be recorded per pit can be tripled at least. The method of the present example is similar to the conventional method as to the use of the surface plasmon resonance for reproducing the information stored in the recording layer. But, according to the present invention, the displacement of the surface level of the recording medium in the out-of-plane direction can also be used as information by utilizing the fact that the surface plasmon resonance is extremely sensitive to the spacing. Therefore, the storage density can be remarkably improved compared with the conventional system utilizing only the displacement of the surface level of the recording medium in the in-plane direction.

In the first example, a dielectric material is used for the recording layer of the recording medium, but the present example employs a metal for the recording layer. Therefore, as is apparent from FIGS. 2 and 4, according to the second example, the distance from the recording medium to the optical head can be made larger than that of the first example. As the distance becomes larger, the possibility that the recording medium will collide with the optical head is reduced, thereby largely improving the reliability. In addition, the difference in pit depth can be made large, so that the pit depth tolerance can be increased during the recording process.

In the second example, gold is used for the recording layer of the recording medium, but the present invention is not limited to the above. Any other metal can be employed, and all of the magnetic and non-magnetic layers can be employed as long as the real part of the complex dielectric constant has a negative value. Moreover, a protective layer may be further laminated on the recording layer. In this case, the refractive index and the angle of the incidence should be determined so that the dispersion relationship of the resulting evanescent wave meets the dispersion relationship of the surface plasmon generated at the interface between the recording layer and the protective layer.

Furthermore, the interaction between the evanescent wave and the surface plasmon is utilized in the present example, but the present invention is not limited to the above. Any other interaction between the evanescent wave and optical elementary excitation such as surface exiton and surface phonon may be used to carry out the present invention.

In the first and second examples, the evanescent wave is generated by a method in which the light is incident on the reflection surface at an incident angle of the critical angle or more. However, the present invention is not limited to the above configuration. The evanescent wave of the present invention may be generated by a method in which the light reflects on or transmits through a member having a fine periodical structure, or the like. That is, the present invention can employ any other method as long as an interaction between the evanescent wave and the recording layer is utilized. Moreover, in the present example, the displacement of the surface level of the recording layer in the out-of-plane direction is detected by the intensity change of the interaction between the evanescent wave and the recording layer. However, the location of an evanescent wave source or the surface level of the recording layer may be controlled so as to uniformly cause the interaction. Therefore, the displacement of the surface level of the recording medium in the out-of-plane direction may be detected on the basis of how much the location is controlled.

One of objectives of the next example of the present invention is to improve the storage density by providing both of the magnetic recording data and the optical recording data in the same track on the same plane, thereby realizing a recording and reproducing apparatus with a higher storage density and a larger capacity.

The conventional optically recording and reproducing method using a diffraction phenomena requires a pit depth of $\lambda/8$ to $\lambda/4$ so as to have sufficient reproduction sensitivity. Therefore, there arises a problem of difficulty in performing magnetic recording in the same track without causing a spacing loss.

For example, in accordance with the conventional CD standard, each pit for recording data has a pit depth of 110 nm, and data is optically reproduced with a reflectivity difference of about 30%. In order to record both of the magnetic recording data and optical recording data in the same track, a metal reflective film of a CD or LD is made of ferromagnetic film which is deposited by a sputtering method, and a magnetic layer is arranged on the surface of the CD or LD (as is disclosed by Japanese Laid-Open Patent Publication No. 56-140536). However, such a technique has a problem of the spacing loss when the magnetically recorded signal is reproduced by electromagnetic induction.

The spacing loss L is given by the following Equation (3):

$$L=54.6\times(\text{spacing } (dm)/\text{magnetic recording wavelength } (\lambda m)) \quad (3)$$

Therefore, when assuming that the magnetic recording wavelength $\lambda m$ is 1 µm, and the degree of change of the spacing $\Delta dm$ by the pit is 110 nm, the total spacing loss L through the recording performance and the reproducing performance is calculated at −12 dB, which makes it difficult to produce the magnetically recorded data.

On the other hand, when the pit depth is made smaller in order to reduce the spacing loss, there arises another problem in that the reproduction sensitivity is reduced.

Conventionally, a medium is proposed in which a phase-change type optical recording film is arranged on a magnetic layer. However, for changing the phase of the phase-change type optical recording film, thermal energy is required. In addition, the medium includes a substrate, the magnetic layer, the phase-change type optical recording film, a metallic film, and a protective film. The phase-change type optical recording film has a thickness of 30 nm, and the metallic film has a thickness of 100 nm. Therefore, there arises a problem of the spacing loss.

In order to read or write a large amount of data, for example, Japanese Laid-Open Patent Publication Nos. 4-26978 and 2-179951 proposed a medium in which the surface of the CD or LD is utilized as an area of a concavo-convex optical recording data pit for optically reproducing data, and the reverse side face thereof is utilized as an area of a magnetic layer for magnetically recording and reproducing data. On the other hand, for example, Japanese Laid-Open Patent Publication No. 59-36347 proposed a medium in which an inner surface of the CD or LD is used for a magnetic layer, and an outer concavo-convex surface thereof is used for an optical recording data pit.

In the prior art, it is difficult to record and reproduce both the magnetic recording data and optical recording data in the same track on the same plane with high sensitivity.

According to the present invention, even if the optical recording data has a small pit depth, it can be reproduced with high sensitivity. Therefore, it is possible to reduce the spacing loss and to record and reproduce both of the magnetic recording data and optical recording data in the same track on the same plane with high sensitivity.

EXAMPLE 3

Figure 5:
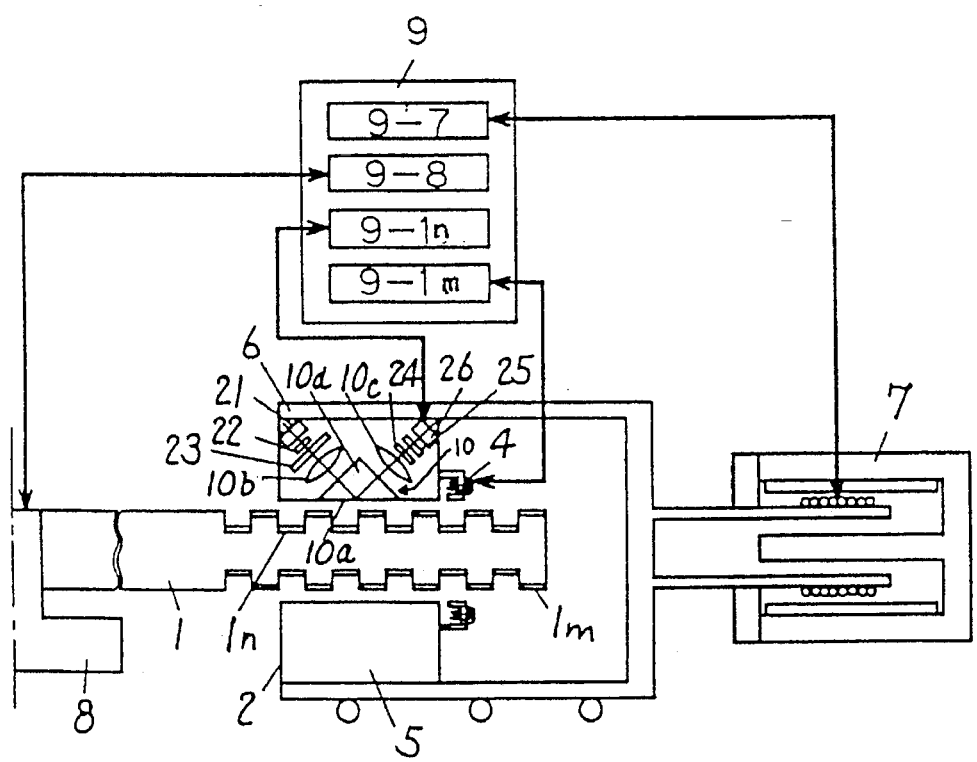
FIG. 5 is a structural overview showing an information recording and reproducing apparatus according to a third example of the present invention.

FIG. 5 schematically shows an information recording and reproducing apparatus according to the present invention.

As is shown in FIG. 5, the information recording and reproducing apparatus has a disk as a recording medium 1, a magnetic layer 1m, a concavo-convex disk substrate 1n, a recording and reproducing head 2, a magnetic head 4, an optical head 5, an evanescent wave generator 10, a prism bottom surface of a reflection surface 10a, a condenser lens 10b, a receiving light lens 10c, a prism 10d, a laser light source 21, a collimator 22, an incident light deflection prism 23, a reflected light deflection prism 24, a receiver lens 25, and a photodiode 26 for detecting change of reflectivity, a member for holding the head 6, a positioning device 7, a rotating member 8, a controller 9, a magnetic recording data processor 9-1m, an optical recording data reproducing processor 9-1n, a positioning controller 9-7, and a rotation controller 9-8.

First, the configuration of the information recording and reproducing apparatus will be described with reference to FIGS. 5 to 9.

Figure 6:
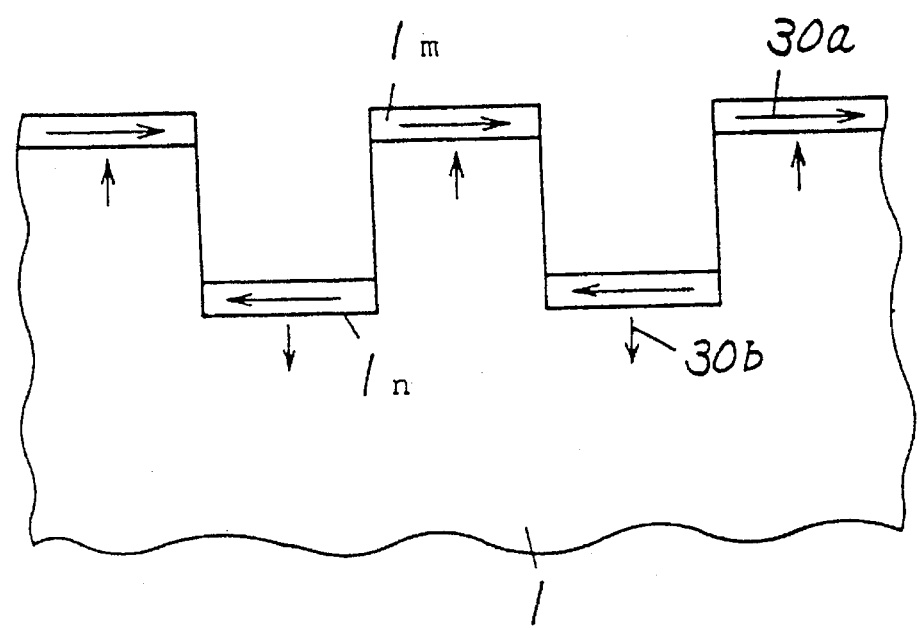
FIG. 6 is a structural view exemplarily showing a recording medium according to the third example.

As is shown in FIG. 6, the disk 1 has a configuration in which the magnetic layer 1m (thickness: 20 nm) for a recording magnetic recording data 30a is arranged on the concavo-convex disk substrate 1n made of polycarbonate resin having optical recording data pits 30b which are concavo-convex pits.

The optical recording data pits 30b of concavo-convex pits are reproduced by the optical head 5 shown in FIG. 5. Hereinafter, the process thereof will be described.

Figure 7:
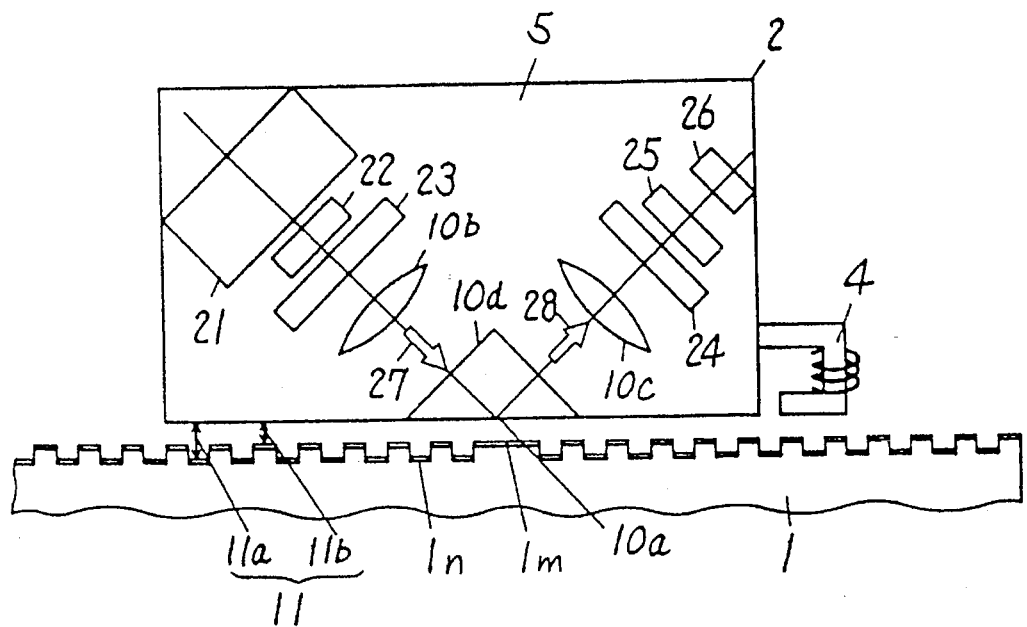
FIG. 7 is a structural view showing the reproduction process of the information recording and reproducing apparatus according to the third example.

As is shown in FIG. 7, the incident light 27 of laser light emitted from the laser light source 21 is made p-polarized light component by the deflection prism 23, and is condensed onto the bottom surface 10a of the prism 10d by the condenser lens 10b at an incident angle of 75 degrees at which the laser light is totally reflected normally. Thereafter, the light amount of the totally reflected light 28 is detected by the photodiode 26. Herein, the prism 10d, the prism bottom surface 10a, the condenser lens 10b, and the receiving light lens 10c constitute the evanescent wave generator 10.

The spacing 11 between the prism bottom surface 10a and the disk 1 corresponds to a wavelength or less of the laser light. The distance of the spacing 11 at the concave portion of the optical recording data pit 30b is different from that at the convex portion thereof.

Figure 8:
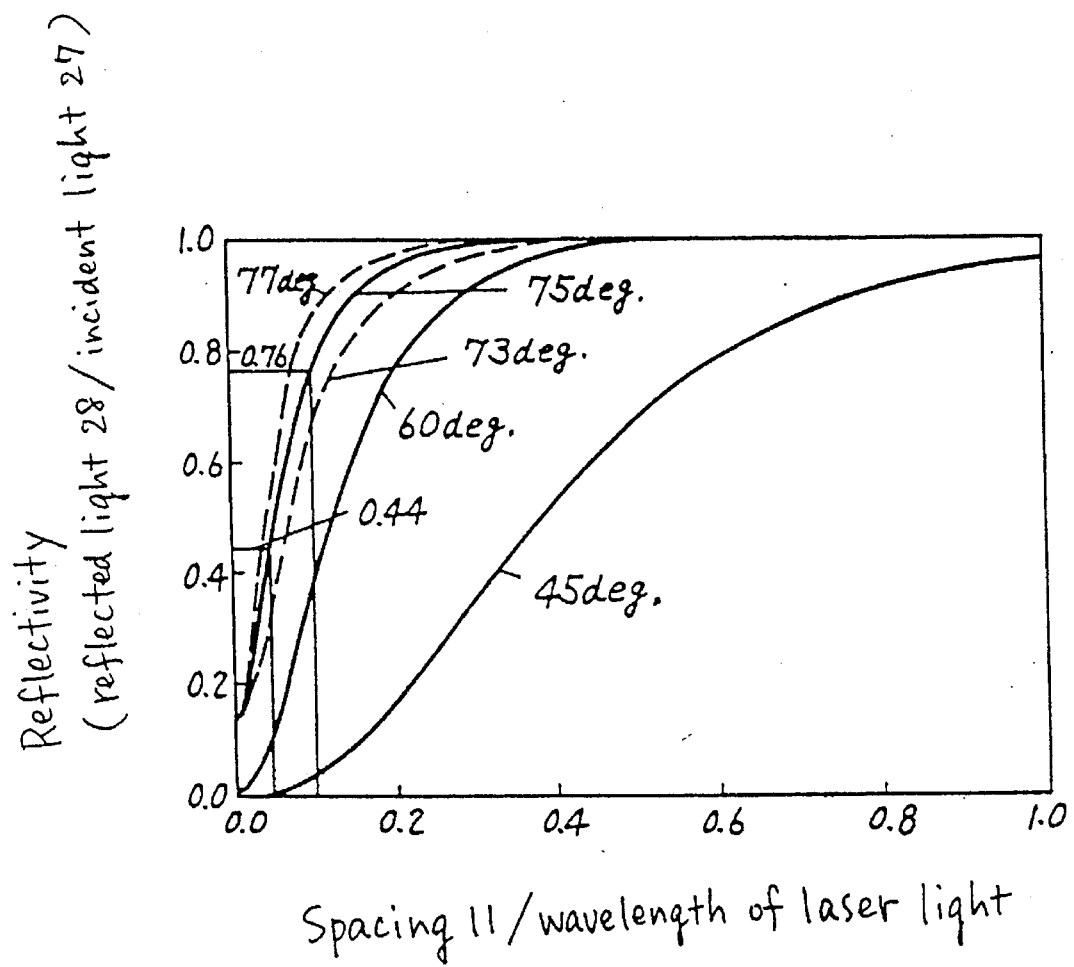
FIG. 8 shows the relationship between a spacing/wavelength of laser light and a reflectivity when magnetic cobalt gamma iron oxide is used for a medium surface according to the third example.

FIG. 8 shows the relationship between the spacing 11 (the spacing 11/wavelength of the laser light) and the reflectivity (reflected light 28/incident light 27). The surface of the medium in this example is made of magnetic cobalt gamma iron oxide.

When the spacing 11 is the wavelength of the incident light 27 or less, the evanescent wave generated outside the prism bottom surface 10a is absorbed into the disk 1 in accordance with the distance of the spacing 11 due to the optical tunneling phenomena, and consequently the reflectivity is changed.

Herein, the wavelength of the incident light 27 is represented by $\lambda$. Herein, when assuming that the depth of the optical recording data pit 30b is $0.05\lambda$ (0.039 µm), the spacing 11a at the concave portion of the pit 30b is $0.1\lambda$, and the spacing 11b at the convex portion of the pit 30b is $0.05\lambda$, the reflectivity for the spacing 11a is 0.76, and the reflectivity for the spacing 11b is 0.44, as is seen from FIG. 8. Therefore, the information is reproduced with the reflectivity difference of 32%.

Accordingly, the information recording and reproducing method utilizing the optical tunneling phenomena of the evanescent wave has higher sensitivity to the pit depth. Therefore, the present method can obtain the same reproduction sensitivity as that of the conventional method for the CD even if the pit depth is one third or less of that of the conventional method for the CD.

As is seen from FIG. 8, the change in the reflectivity depending on the spacing 11 is increased as the incident angle is increased, so that the reproduction sensitivity can be improved by setting the incident angle at 75 degrees or more.

In FIG. 7, the disk surface is made of the magnetic layer, so that the magnetic recording data 30a can be recorded, reproduced, and erased by magnetic induction or electromagnetic induction of the magnetic head 4 in a manner similar to that of a conventional magnetic disc apparatus.

Herein, the spacing loss L of the pit can be calculated from the Equation (3) at −4 dB, which is a sufficient small value compared with that of a conventional method in which the magnetic layer is arranged on the CD. Therefore, according to the present example, the magnetic recording data can be recorded onto and reproduced from the CD.

As is described above, the magnetic layer is deposited by a sputtering method on the disk surface having the pit, and the optical recording data is reproduced by the information recording and reproducing method utilizing the optical tunneling phenomena of the evanescent wave. Thus, recording, reproducing, and erasing performance of the magnetic recording data in the same track is carried out by utilizing the magnetic induction and the electromagnetic induction. Compared with the conventional CD, the capacity for magnetic recording data can be enlarged, and the reproduction sensitivity can be improved, thereby enabling high density of the optical recording data.

Moreover, compared with the conventional magnetic disc apparatus, the present apparatus has advantages in that the capacity for the optical recording data is enlarged, and the tracking servo is performed even when the magnetic recording data is recorded and reproduced by a method in which the optical recording data is made into a tracking servo signal of the recording and reproducing head. Therefore, high track density, and high recording density can be realized.

According to the present example, the optical recording is performed by utilizing the dependency of the reflectivity on the spacing based on the optical tunneling phenomena, and the magnetic recording is performed in the same track. Such a method has some advantages over the conventional method in which the optical recording and reproducing is performed by utilizing the dependency of the reflectivity on the incident angle due to the surface plasmon phenomena of the evanescent wave. For example, the magnetic recording data can be recorded and reproduced in the same track without spacing loss, and the reproduction sensitivity is robust to the incident angle of the laser light.

FIG. 8 shows the relationship between the incident angle and the reflectivity when the medium surface is made of cobalt gamma iron oxide. As is seen from FIG. 8, the reproduction sensitivity can be maintained at about 30%, even if the spacing is changed by about 10%, and the incident angle is changed by about ±2 degrees.

Figure 9A:
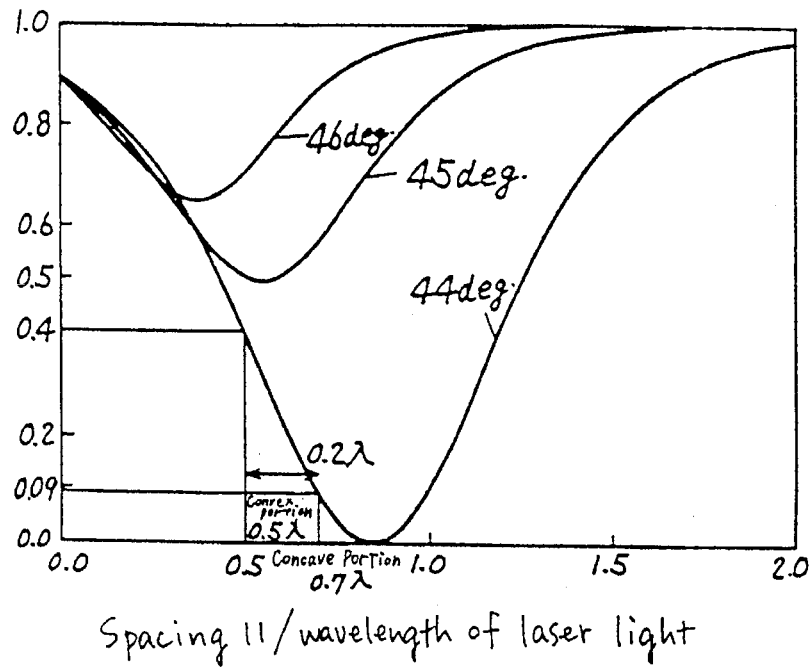
FIG. 9A shows the relationship between a spacing/wavelength of laser light and a reflectivity when gold is used for a medium surface according to the third example.
Figure 9B:
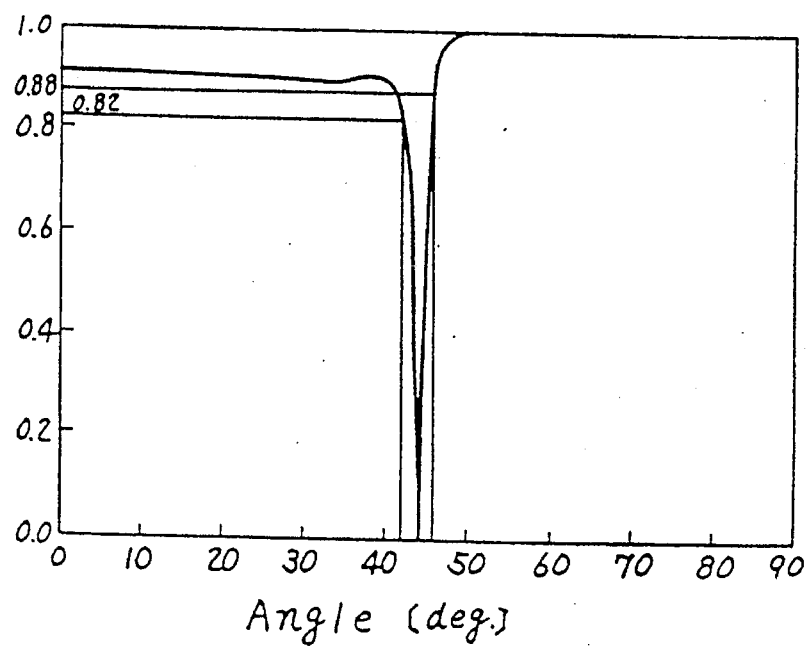
FIG. 9B shows the relationship between a spacing/wavelength of laser light and a reflectivity when gold is used for a medium surface according to a conventional example.

On the other hand, FIG. 9B shows a conventional relationship between the incident angle and the reflectivity when the medium surface is made of gold. As is seen from FIG. 9B, the reproduction sensitivity is 20% or less, if the incident angle is changed by about ±2 degrees.

When the surface plasmon resonance of the evanescent wave is employed, the same effects can be obtained.

FIG. 9A shows the relationship between the spacing 11 (the spacing 11/wavelength of the laser light) and the reflectivity (reflected light 28/incident light 27) when the information recording and reproducing method utilizing the surface plasmon resonance generated by the evanescent wave is employed. The surface of the disk is made of gold. As is seen from FIG. 9A, when the information recording and reproducing method utilizing the surface plasmon resonance generated by the evanescent wave is employed, the optical recording data pit 30b requires a depth of 0.2λ or more in order to reproduce the optical recording data 30b with high sensitivity. Therefore, the depth of the optical recording data pit 30b inevitably becomes 0.16 μm when the laser wavelength λ is 780 nm, and therefore, the spacing loss becomes about −17 dB.

Therefore, it is possible to record the magnetic recording data and the optical recording data in the same track by using a magnetic layer with the proviso that a real part of the complex dielectric constant is negative, the imaginary part of the complex reflectivity is equal to that of the metal, and the surface plasmon is excited at an incident angle of about 75 degrees; and emitting a laser light to the evanescent wave generator.

Thus, according to the third example, optical recording data is present as a pit on a disk, the surface of the disk is made of a magnetic layer, and the recording and reproducing head is composed of a magnetic head and an optical head. With such a configuration, the optical recording data is reproduced utilizing the optical tunnel effects of the evanescent wave. Thus, both of the magnetic recording data and the optical recording data can be recorded and reproduced with high sensitivity, thereby realizing a recording and reproducing apparatus having robustness, high recording density, and large capacity.

Figure 10:
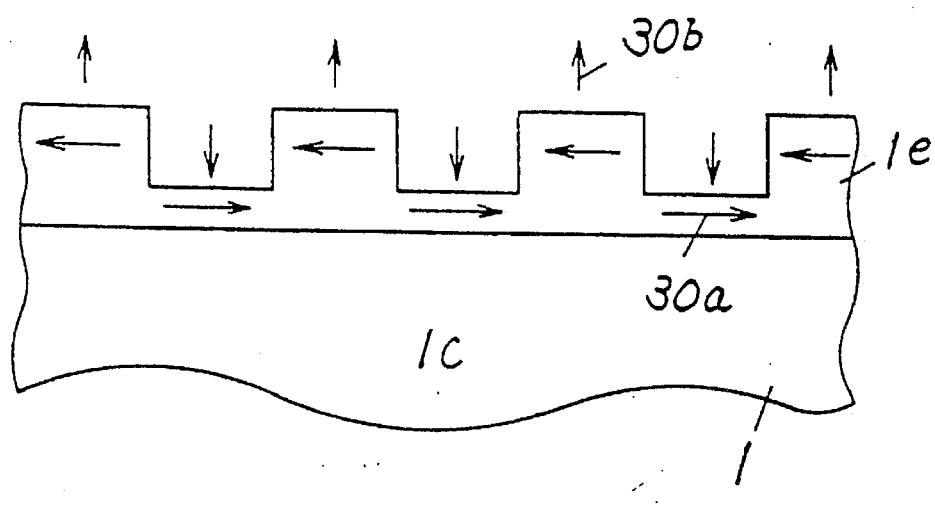
FIG. 10 is a structural view exemplarily showing another recording medium according to the third example.

According to the third example, the concavo-convex optical recording data pit is formed on the disk substrate made of polycarbonate resin, and the magnetic layer is formed on the disk by a sputtering method. As is shown in FIG. 10, even if the magnetic layer is arranged on a flat disk substrate having no pit, or the concavo-convex optical recording data pit is formed on the magnetic layer by pressing or the like, the same effects can be obtained.

EXAMPLE 4

Figure 11:
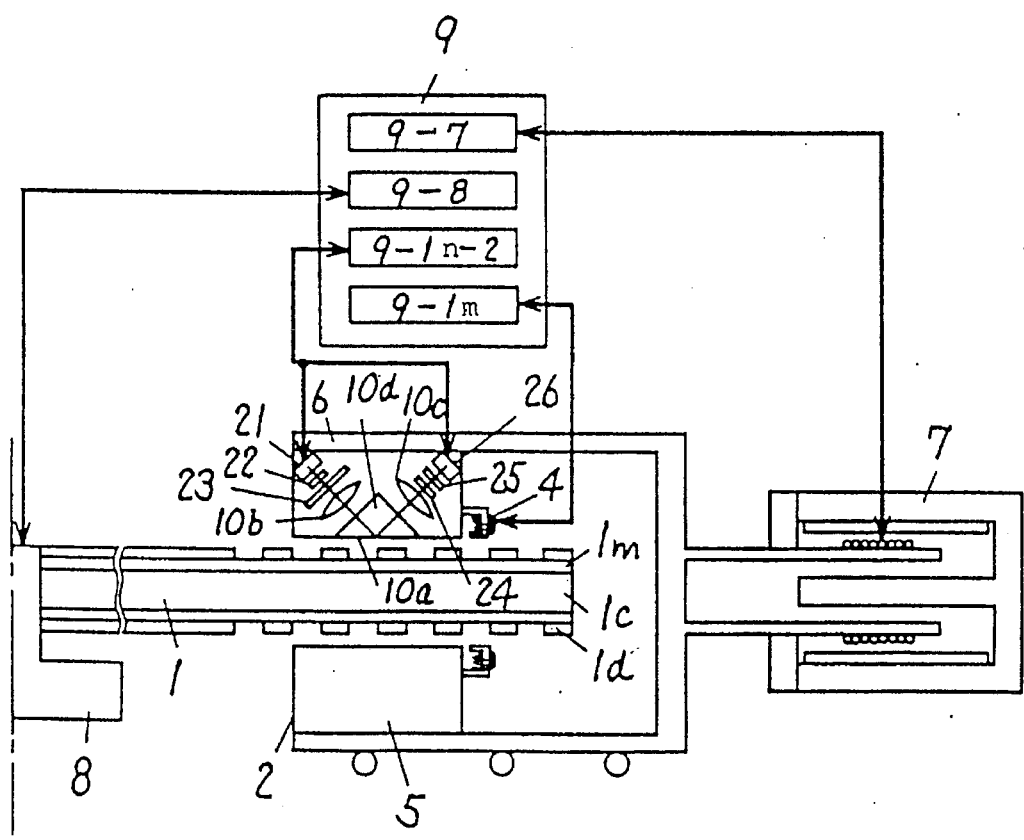
FIG. 11 is a structural overview showing an information recording and reproducing apparatus according to a fourth example of the present invention.

FIG. 11 schematically shows an information recording and reproducing apparatus according to a fourth example of the present invention.

As is shown in FIG. 11, the information recording and reproducing apparatus has a disk as a recording medium 1, a magnetic layer 1m, a recording and reproducing head 2, a magnetic head 4, an optical head 5, an evanescent wave generator 10, a prism bottom surface functioning as a reflection surface 10a, a condenser lens 10b, a receiving light lens 10c, a prism 10d, a laser light source 21, a collimator 22, an incident light deflection prism 23, a reflected light deflection prism 24, a receiver lens 25, a photodiode 26 for detecting change of reflectivity, a member for holding the head 6, a positioning device 7, a rotating member 8, a controller 9, a magnetic recording data processor 9-1m, a positioning controller 9-7, and a rotation controller 9-8. The above configuration is the same as that of FIG. 5 except the following: a flat disk substrate 1c and an optical recording film 1d are arranged on the disk 1, and the optical recording data recording and reproducing processor 9-1n-2 is arranged at the controller 9.

Hereinafter, the information recording and reproducing apparatus having the above configuration will be described with reference to FIGS. 8, 9, and 11 to 13.

Figure 12:
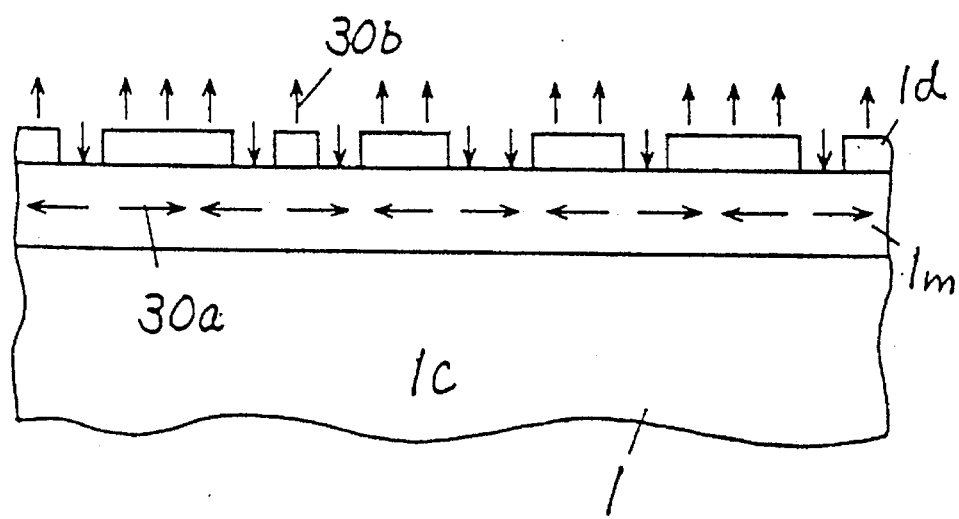
FIG. 12 is a structural view showing a recording medium according to the fourth example.

In FIG. 12, at the disk 1, a magnetic layer is arranged on the flat disk substrate 1c for recording, reproducing and erasing the magnetic recording data 30a. Furthermore, the optical recording film 1d for an additional optical disk is arranged thereon so as to have permeability of about 1 and a thickness of 0.05λ.

The concavo-convex optical data pit 30b is recorded and reproduced by the optical head 5 shown in FIG. 11. Hereinafter, the process will be described.

First, the recording process of the optical recording data pit 30b will be described.

Figure 13:
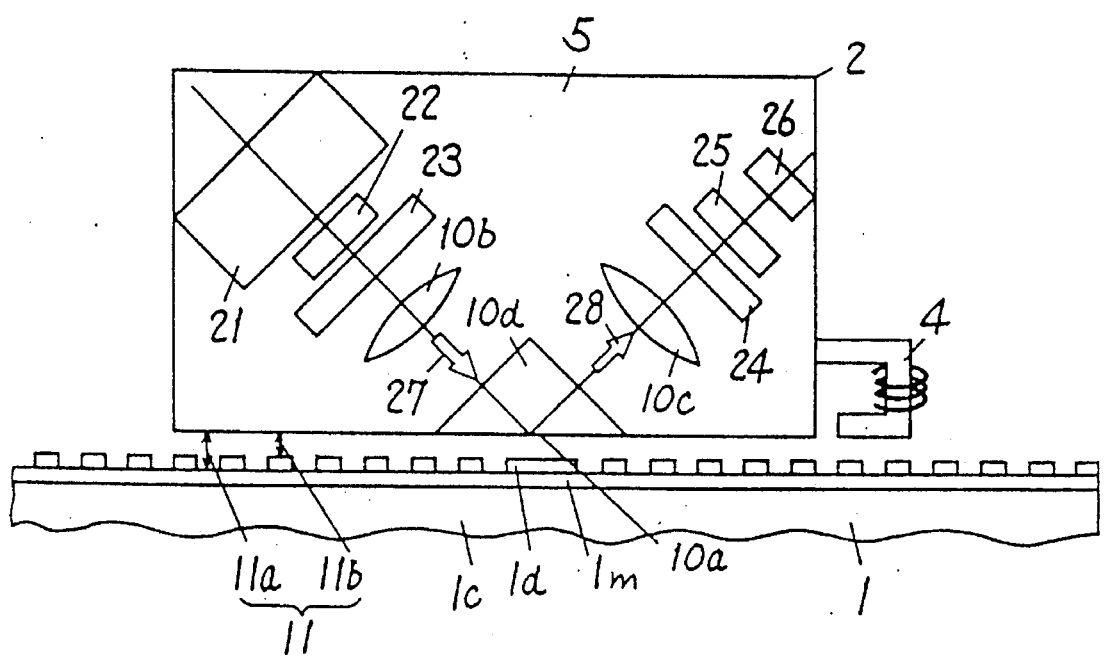
FIG. 13 is a structural view showing a reproduction process of the information recording and reproducing apparatus according to the fourth example.

As is shown in FIG. 13, the incident light 27 of laser light emitted from the laser light source 21 is made p-polarized light component by the deflection prism 23, and condensed onto the bottom surface 10a of the prism 10d by the condenser lens 10b at an incident angel of 45 degrees at which the laser light is totally reflected normally. The optical recording data recording and reproducing processor 9-1n-2 sets the output of the laser light source 21 at 10 mW.

FIG. 8 shows the relationship between the spacing 11 (the spacing 11/wavelength of the laser light) and the reflectivity ( reflected light 28/incident light 27). When the spacing 11 is the wavelength of the incident light 27 or less, the evanescent wave generated outside the prism bottom surface 10a is absorbed into the disk 1 in accordance with the distance of the spacing 11 due to the optical tunneling phenomena, and consequently the reflectivity is changed.

When assuming that the spacing 11 is 0.05λ, approximately 100% of the incident light 27 is absorbed into the disk 1. With the heat generated at that time, a hole is formed in the optical recording film 1d, thereby forming the optical recording data pit 30b.

Next, the reproduction process of the optical recording data pit 30b will be described.

For the reproducing performance, the optical recording data recording and reproducing processor 9-1b-2 sets the output of the laser light source 21 at 1 mW, and the incident angle at 75 degrees, and then the amount of the totally reflected light 28 is detected by the photodiode 26.

The spacing 11 between the prism bottom surface 10a and the disk 1 is a wavelength or less of the laser light. At this time, the distance of the spacing 11 of the concave portion of the optical recording data pit 30b is different from that of the convex portion thereof.

When assuming that the depth of the optical recording data pit 30b is 0.05λ, which corresponds to the thickness of the optical recording film 1d; the spacing 11a at the concave portion of the pit 30b is 0.1λ, and the spacing 11b at the convex portion of the pit 30b is 0.05λ, the reflectivity for the spacing 11a is 0.76, and the reflectivity for the spacing 11b is 0.44, as is seen from FIG. 8. Therefore, the present method can obtain the same reproduction sensitivity as that of the conventional method for the CD even if the pit depth is about one third of that of the conventional method for the CD.

Accordingly, the information recording and reproducing method utilizing the optical tunneling phenomena of the evanescent wave has higher sensitivity against the pit depth. Therefore, compared with the method employed for the CD, the present method can obtain the same sensitivity as that of the method for the CD even if the pit depth is one third or less of the method for the conventional CD.

In FIG. 13, the magnetic layer is arranged under the optical recording film 1d, so that the magnetic recording data 30a can be recorded, reproduced, and erased by the magnetic induction and electromagnetic induction of the magnetic head 4 in a manner similar to that of the conventional magnetic disc apparatus.

Herein, the spacing loss L of the pit can be calculated from the Equation (3) at −4 dB, which is a sufficient small value compared with that of the conventional method in which the magnetic layer is arranged on the CD. Therefore, according to the present example, the magnetic recording data can be recorded and reproduced.

Next, the case where a phase-change type optical recording film is used as the optical recording film on the magnetic layer will be described. Conventionally, a metal film is used for thermally changing the phase of the phase-change type optical recording film. However, according to the present invention, the incident angle is set at 45 degrees, and the spacing between the phase-change type optical recording film and the protective film is set at about $0.1\lambda$, so that about 95% of the incident light is absorbed into the optical recording film as is seen from FIG. 8, thereby making it possible to record and reproduce the optical recording data without using the metal film. Since the use of the metal film can be omitted in the present example, the magnetic recording data can be recorded and reproduced with further reduced spacing loss.

As is described above, the magnetic layer is sputtered on the flat disk substrate, and the optical recording film for the additional optical disk is arranged thereon. Thus, the optical recording data is recorded and reproduced by the information recording and reproducing method utilizing the optical tunneling phenomena of the evanescent wave. The magnetic recording data is recorded, reproduced, and erased by utilizing the magnetic induction and the electromagnetic induction. Compared with the case of the CD, the capacity for magnetic recording data can be enlarged, and the reproduction sensitivity can be improved, thereby enabling high recording density of the optical recording data.

Moreover, compared with the conventional magnetic disc apparatus, the present apparatus has advantages in that the capacity for the optical recording data is enlarged, and the tracking servo is performed even when the magnetic recording data is recorded and reproduced by the method in which the optical recording data is made into a tracking servo signal of the recording and reproducing head. Therefore, high track density, and high recording density can be realized.

According to the present example, the optical recording is performed by utilizing the dependency of the spacing on the reflectivity due to the optical tunneling phenomena, and the magnetic recording is performed in the same track. Such a method has some advantages over the conventional method in which the optical recording and reproducing is performed by utilizing the dependency of the reflectivity on the incident angle due to the surface plasmon phenomena of the evanescent wave. For example, the magnetic recording data can be recorded and reproduced in the same track without spacing loss, and the reproduction sensitivity is robust to the incident angle of the laser light.

FIG. 8 shows the relationship between the incident angle and the reflectivity when the medium surface is made of cobalt gamma iron oxide. As is seen from FIG. 8, the reproduction sensitivity can be maintained at about 30%, even if the spacing is changed by about 10%, and the incident angle is changed by about ±2 degrees.

On the other hand, FIG. 9B shows a conventional relationship between the incident angle and the reflectivity when the medium surface is made of gold. As is seen from FIG. 9B, the reproduction sensitivity is 20% or less, if the incident angle is changed by about ±2 degrees.

Moreover, the same effects can be obtained, even if the optical recording data is reproduced and the magnetic recording data is recorded and reproduced in the same track by utilizing the dependency of the spacing on the reflectivity according to the information recording and reproducing method utilizing the surface plasmon resonance of the evanescent wave.

FIG. 9A shows the relationship between the spacing 11 (the spacing 11/wavelength of the laser light) and the reflectivity ( reflected light 28/incident light 27) when the information recording and reproducing method utilizing the surface plasmon resonance generated by the evanescent wave is employed. The surface of the disk is made of gold. As is seen from FIG. 9A, when the information recording and reproducing method utilizing the surface plasmon resonance generated by the evanescent wave is employed, the optical recording data pit 30b requires a depth of $0.2\lambda$ or more in order to reproduce the optical recording data pit 30b with high sensitivity. Therefore, the depth of the optical recording data pit 30b inevitably becomes 0.16 μm when the laser wavelength $\lambda$ is 780 nm, and therefore, the spacing loss becomes about −17 dB.

Therefore, it is possible to record the magnetic recording data and the optical recording data in the same track by using a magnetic layer with proviso that a real part of the complex dielectric constant is negative, the imaginary part of the complex reflectivity is equal to that of the metal, and the surface plasmon is excited at an incident angle of about 75 degrees; and emitting a laser light to the evanescent wave generator.

Thus, according to the fourth example, optical recording data is present as a pit array on a disk, the surface of the disk is made of a magnetic layer, and the recording and reproducing head is composed of a magnetic head and an optical head. With such a configuration, the optical recording data is reproduced utilizing the optical tunnel effects of the evanescent wave. Thus, both of the magnetic recording data and the optical recording data can be recorded and reproduced with high sensitivity, thereby realizing a recording and reproducing apparatus having robustness, high recording density, and large capacity.

According to the fourth example, the concavo-convex optical recording data pit is formed on the disk substrate made of polycarbonate resin, and the magnetic layer is formed on the disk by a sputtering method. As is shown in FIG. 10, even if the magnetic layer is arranged on a flat disk substrate having no pit, or the concavo-convex optical recording data pit is formed on the magnetic layer by pressing or the like, the same effects can be obtained.

In the third and fourth examples, the pit depth is set at $0.05\lambda$ and the spacing between the prism and the disk is set at $0.05\lambda$ or $0.1\lambda$, but other values may also be used to obtain the effects of the present invention as long as sufficient reproduction sensitivity can be obtained.

In the third and fourth examples, the polarized light component is p component, but s component and p-s component may also be employed to obtain the effects of the present invention as long as sufficient reproduction sensitivity can be obtained.

In the third and fourth examples, the incident angle is set at 75 degrees, but other values may also be employed to obtain the effects of the present invention as long as sufficient reproduction sensitivity can be obtained, the evanescent wave can be generated at the prism bottom surface, and the incident light can be totally reflected.

In the third and fourth examples, the method utilizing a prism coupler is used for generating the evanescent wave, but other methods may also be employed to obtain the effects of the present invention as long as the evanescent wave can be excited.

In the third and fourth examples, the polycarbonate resin is used for the concavo-convex disk substrate having the optical recording data pit, but other materials such as glass may also be employed to obtain the effects of the present invention as long as the optical recording data pit can be formed.

In the third and fourth examples, the magnetic recording data is recorded or erased by the magnetic induction, and reproduced by electromagnetic induction, but it can also be recorded or erased by using thermal magnetic effects and also be reproduced by using the magneto-optical effects to obtain the effects of the present invention as long as the reproduction sensitivity to the reflectivity of the concavo-convex magnetic layer functioning as the optical recording data pit is sufficient.

In the third example, the thickness of the magnetic layer film is set at 20 nm, but other values may also be employed to obtain the effects of the present invention as long as the reproduction sensitivity is sufficient when the optical recording data is reproduced by utilizing the optical tunnel effect of the evanescent wave.

In the fourth example, the thickness of the optical recording film is set at $0.2\lambda$, but other values may also be employed to obtain the effects of the present invention as long as the reproduction sensitivity is sufficient when optical recording data is reproduced by utilizing the tunnel effect of the evanescent wave.

In the third and fourth examples, the straight type of positioning device is used as the positioning device, but other type ones such as a floating type one and a rotating type one may also be employed to obtain the effects of the present invention as long as the recording and reproducing head can be positioned to an arbitrary position with a constant spacing.

In the third and fourth examples, a voice coil motor is used as the positioning device, but a stepping motor, ultrasonic motor, piezo-element actuator, or the like may also be employed for the positioning device to obtain the effects of the present invention as long as the recording and reproducing head can be position to an arbitrary position with a constant spacing.

In the third and fourth examples, the disk is rotated so as to directly position the recording and reproducing head to the arbitrary position by the positioning device, but the disk alone, or the recording and reproducing head alone, or both of them may be moved in an arbitrary way to obtain the effects of the present invention as long as the recording and reproducing head can be positioned to the arbitrary position with a constant spacing.

In the third and fourth examples, the medium is constituted by a disk, but the medium may also be constituted by a card, a tape, or the like to obtain the effects of the present invention as long as the medium has a structure in which a magnetic recording data layer is arranged on the optical recording data pit layer; a structure in which the magnetic layer includes an optical recording data pit; or a structure in which the magnetic layer is arranged on the medium substrate and the optical recording film is arranged thereon.

In the fourth example, the optical recording film for the additional optical disk is used as the optical recording film, but a phase-change type optical recording film or the like may also be employed to obtain the effects of the present invention as long as the reflectivity reproduction sensitivity is sufficiently high during the reproduction process of the optical recording data.

In the third and fourth examples, the photodiode is used as the reflectivity change detecting section, but other materials may also be employed to obtain the effects of the present invention as long as photoelectric conversion can be performed.

In the third and fourth examples, the medium surface is made of magnetic cobalt gamma iron oxide, but the other magnetic bodies such as magnetic barium ferrite, magnetic alpha iron, or the like may also be employed to obtain the effects of the present invention.

In the third and fourth examples, gold is used for the medium surface for exciting the surface plasmon, but other materials such as aluminum, and silver may also be used to obtain the effects of the present invention as long as the real part of the complex dielectric constant is negative.

In the third and fourth examples, the optical recording data pit has a concave portion and a convex portion, i.e., has binary digits of "0" and "1". However, even if there are several levels in pit depth and more than two values are recorded in the out-of-phase direction, the effects of the present invention can be obtained.

In the third and fourth examples, the photodiode functioning as the reflected light detection section detects the reflected light passing through the receiving light lens, reflected light polarizing prism, and the receiver lens. However, the effects of the present invention can be obtained even if the photodiode may be arranged on the reflective surface of the prism so as to directly detect the reflected light.

As is described above, according to the third and fourth examples, optical recording data is stored as a pit on a disk, the surface of the disk is made of the magnetic layer, and the recording and reproducing head is composed of the magnetic head and the optical head. With such a configuration, the optical recording data is reproduced utilizing the optical tunnel effects of the evanescent wave. Thus, both of the magnetic recording data and the optical recording data can be recorded and reproduced with high sensitivity, thereby realizing a recording and reproducing apparatus having robustness, high density and large capacity.

In the first to fourth examples, the recording medium is made of a rigid disk, but a flexible disk may also be used to obtain the effects of the present invention.

According to the present invention, it is possible to design the recording medium so that every pit depth (or height) is not more than one eighth of the wavelength of the laser light while maintaining the sufficient reproduction sensitivity. In addition, it is also possible to design the recording medium so that every pit depth (or height) is not less than one fourth of the wavelength of the laser light while maintaining the sufficient reproduction sensitivity.

In the first to fourth example, the disk is used for the recording medium, but the present invention is not limited to the shape of the recording medium, so that the effects of the present invention can be obtained even when the tape or the card is used for the recording medium.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A recording medium comprising a plurality of concavo-convex pits, to which laser light is emitted, wherein a minimum value of the dimension of said concavo-convex pits measured along the direction normal to said recording medium is less than one eighth of the wavelength of said laser light, and wherein a recorded data is reproduced by an evanescent wave in accordance with how much said concavo-convex pits influence said evanescent wave.

2. A recording medium comprising a plurality of concavo-convex pits, to which laser light is emitted, wherein a maximum value of the dimension of said concavo-convex pits measured along the direction normal to said recording medium is at least one fourth of the wavelength of said laser light.

3. A recording medium according to claim 2, wherein a recorded data is reproduced by an evanescent wave in accordance with how much said concavo-convex pits influences said evanescent wave.

4. A recording medium comprising a plurality of concavo-convex pits having three or more different levels of height or depth, each of said different levels representing a different recorded data value, wherein a minimum value of the dimension of said concavo-convex pits measured along the direction normal to said recording medium is less than one eighth of the wavelength of said laser light, and wherein the different recorded value is reproduced by an evanescent wave in accordance with how much said concavo-convex pits influence said evanescent wave.

5. A recording medium comprising a plurality of concavo-convex pits having three or more different levels of height or depth, each of said different levels representing a different recorded data value, wherein a maximum value of the dimension of said concavo-convex pits measured along the direction normal to said recording medium is greater than one fourth of the wavelength of said laser light.

6. A recording medium according to claim 5, wherein the different recorded value is reproduced by an evanescent wave in accordance with how much said concavo-convex pits influences said evanescent wave.

* * * * *